INVENTORS:
GLEN L. BOWEN
ROBERT W. LEMON

ATTORNEYS

July 12, 1966  G. L. BOWEN ETAL  3,260,134
CONTROLLED STEERING DIFFERENTIAL WITH EXTERNAL BRAKES
Filed Sept. 3, 1963  3 Sheets-Sheet 3

INVENTORS:
GLEN L. BOWEN
BY ROBERT W. LEMON

ATTORNEYS

United States Patent Office 3,260,134
Patented July 12, 1966

3,260,134
CONTROLLED STEERING DIFFERENTIAL WITH EXTERNAL BRAKES
Glen L. Bowen, Detroit, and Robert W. Lemon, Farmington, Mich., assignors to G. L. Bowen & Co., Oak Park, Mich., a corporation of Michigan
Filed Sept. 3, 1963, Ser. No. 306,228
4 Claims. (Cl. 74—710.5)

Our invention relates generally to improvements in differential gear systems, and more particularly to a new and improved steering differential mechanism capable of being used in heavy duty vehicle drivelines.

Our improved mechanism is capable of delivering driving torque from a driving pinion to each of two power output shafts that are transversely disposed with respect to the axis of the driving pinion. Each power output shaft in turn may be connected to a separate driving track or vehicle traction wheel. Provision is made for controlling the relative motion of the power output shafts to provide controlled steering.

The differential mechanism of our invention includes a differential carrier about which is mounted a differential ring gear that is in geared relationship with respect to the driving pinion. In the embodiment herein disclosed, a geared right angle bevel gear reduction drive is situated between the ring gear and the driving pinion to establish an additional speed reduction in the driveline. The differential carrier rotatably supports pairs of differential pinions, one pinion of each pair being in meshing engagement with a separate differential side gear. Each side gear in turn is connected to a power output shaft.

A steering gear is carried by one pinion of each pair. Each steering gear in turn meshes with a gear carried by a steering gear sleeve shaft that is rotatably mounted about one of the power output shafts. The pinions of each pair engage each other so that driving motion is imparted to each power output shaft as the carrier is rotated.

A brake disc is carried by each sleeve shaft on the outboard side of the housing for the differential mechanism. Each brake disc can be controlled by means of driver operated spot brakes to retard or stop the motion of one sleeve shaft with respect to the other. Turning maneuvers for the vehicle can be accomplished in this fashion.

According to a principal feature of our invention, each pinion is formed with separate gear portions having different pitch diameters. The larger pitch diameter portion of one pinion of each pair meshes with the larger pitch diameter portion of the other pinion of that pair. The smaller pitch diameter portion of each pinion engages a separate differential side gear.

The pinions are mounted upon pinion shafts that are end supported within the carrier.

We are aware of various steering differential mechanisms of this type wherein the pinions of each pair are journalled relatively close to each other so that the geared portions thereof can be adapted for meshing engagement. This necessarily requires a relatively close spacing of the pinion bearings. If such a mechanism is to be conducted for high torque operation, it is necessary to design the pinions with a relatively large pitch diameter in order to provide adequate pinion life. This necessarily reduces thes pace that is available for the pinion bearings. Thus the bearing life may be reduced if the torque capacity of the pinions is increased. Conversely, if adequate bearing life is sought, it is necessary to reduce the pitch diameters of the pinions.

It thus is necessary to arrive at a design compromise to establish the best condition for adequate pinion life and also the best condition for maximum bearing life. It is an object of our invention, therefore, to avoid the necessity for making this design compromise so that the pinions may be designed for maximum torque capacity without reference to design variables that affect bearing life.

It is a further object of our invention to provide a steering differential mechanism of this type wherein the profiles of the differential side gears and the pinions can be modified to establish optimum stress conditions at the pinion tooth contact without adversely affecting the stress conditions at the tooth contact of either companion pinion with its differential side gear.

It is a further object of our invention to provide an improved differential lubrication system that does not require the use of auxiliary lubrication pressure pumps or lubrication spray jets.

It is a further object of our invention to provide a steering differential mechanism of the type above set forth, wherein the friction elements of the brake structure for accomplishing geared steering are located entirely outside of the differential housing, thereby making it possible to employ air cooling to advantage.

It is a further object of our invention to provide a steering differential mechanism that is characterized by a high torque transmitting capacity with minimum space requirements.

It is a further object of our invention to provide a steering differential mechanism wherein provision is made for avoiding over-heating of the lubricating oil during operation.

It is a further object of our invention to provide a steering differential mechanism of the type above set forth wherein provision is made for obtaining an additional speed reduction by employing auxiliary reduction gear elements in combination with the differential ring gear and rotatably mounting the auxiliary elements within a housing that is common to the differential carrier.

For the purpose of describing our invention more particularly, reference will be made to the accompanying drawings, wherein.

Figure 1:
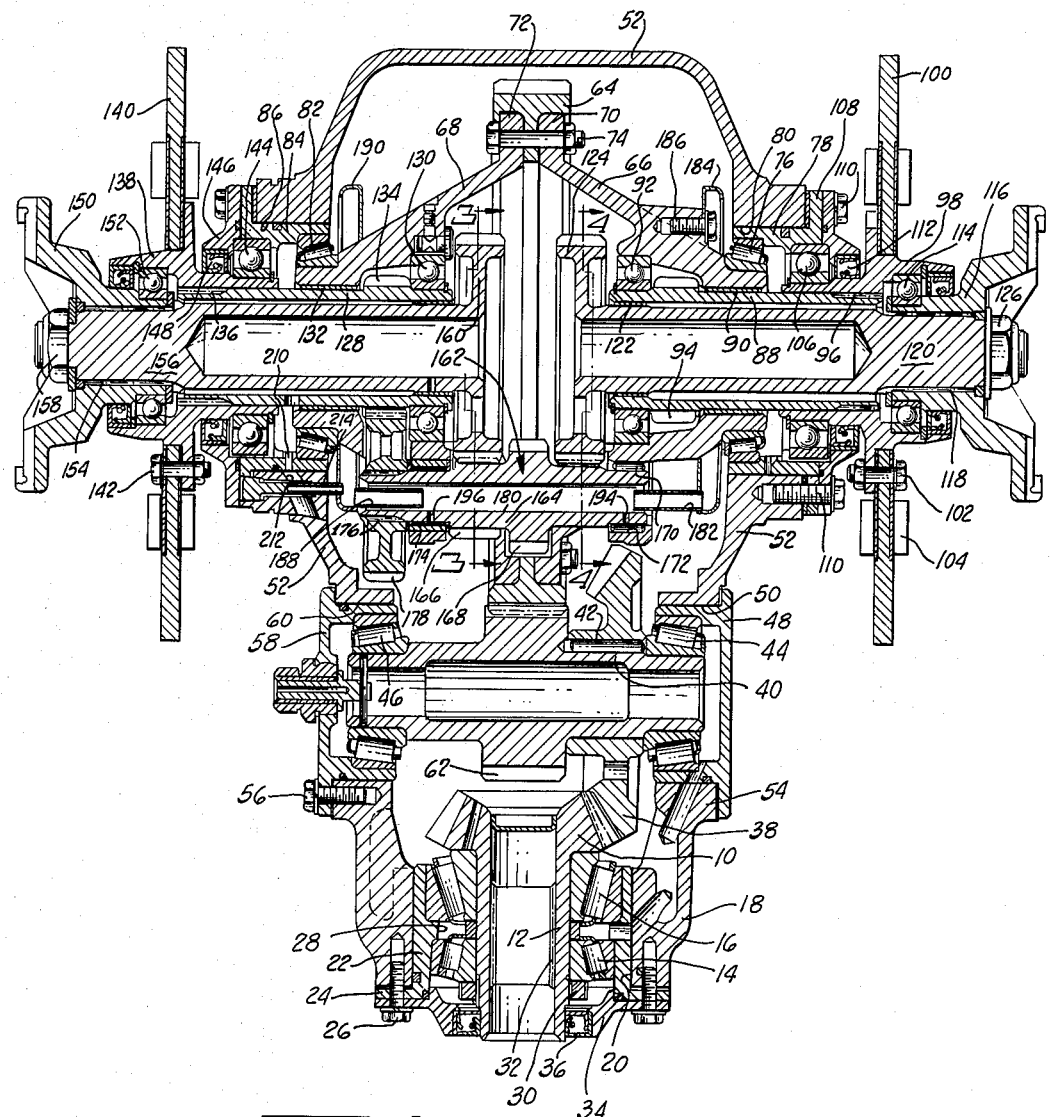
FIGURE 1 shows in cross-sectional form the assembly of the torque transmitting gears that comprise the differential mechanism.

Referring first to FIGURE 1, reference numeral 10 designates generally a power input pinion. It is carried by a pinion shaft 12 which in turn is journalled by means of tapered roller bearings 14 and 16 within a housing portion 18. A bearing opening 20 is formed in the housing portion 18 to receive the roller bearings 14 and 16.

A bearing retainer 22 is situated within the opening 20 and is flanged at 24 to permit a bolted connection between it and the housing portion 18, suitable bolts 26 being provided for this purpose.

The interior of the retainer 22 is formed with a shoulder 28. Retainer 22 receives the outer races of the bearings 16 and 14. The inner races of these bearings receive the shaft 12. The bearings are pre-loaded by means of a clamping nut 30 which is threaded upon the end of shaft 12.

The interior of shaft 12 can be splined at 32 to permit a driving connection with a splined drive shaft that may be engine powered.

An end plate 34 is bolted as shown to the end of the housing portion 18 and it retains a seal 36 which surrounds the shaft 12.

Bevel pinion 10 engages a bevel gear 38 which is supported by means of a pinion shaft 40. Gear 38 is keyed by means of a key 42 to the shaft 40. Bearings 44 and 46 provide end support for the shaft 40. Bearing 44 is received within a bearing opening formed in a bearing adaptor 48. The adaptor in turn is received within a bearing opening 50 formed in a housing portion 52. This housing portion is received telescopically over a flanged end 54 of the housing portion 18 and is bolted to it by bolts 56.

Bearing 46 is received within a bearing opening formed in a bearing adaptor 58 which in turn is received within an opening 60 formed in the housing portion 52.

A pinion 62 is carried by the shaft 40. It meshes with a differential ring gear 64 which is supported by the differential carrier housing.

The carrier housing includes a first part 66 and a second part 68. Each part is flanged on its outer periphery, as indicated at 70 and 72, to facilitate a bolted connection with the ring gear 64, suitable bolts 74 being provided for this purpose.

Housing part 66 is journalled by means of a bearing 76 which is received within an opening formed in a bearing adaptor 78. This adaptor in turn is received within an opening 80 formed in the housing portion 52.

Housing part 68 is journalled by means of a bearing 82 within a bearing adaptor 84. The adaptor is received within an opening 86 formed in the housing portion 52.

A sleeve shaft 88 is journalled by means of a bushing 90 within the carrier housing part 66. It is journalled also by means of a ball bearing 92 located at a location that is spaced from the bushing 90. A steering gear 94 is formed on the shaft 88 at a location between bearing 92 and the bushing 90. The outboard end of sleeve shaft 88 is splined at 96 to a brake disc hub 98. This hub in turn carries a brake disc 100 located on the outboard side of the housing portion 52, suitable bolts 102 being provided for this purpose. Cooling vanes 104 are carried by the disc 100 to establish radial flow of air across the surfaces of the disc 100 for cooling purposes.

Hub 98 is journalled by means of a bearing 106 within the adaptor 78. An end plate 108 is bolted to the side of the housing portion 52 by bolts 110. The same bolts retain the adaptor 78 in place.

End plate 108 retains a fluid seal 112 which surrounds the hub 98.

Hub 98 receives a bearing 114 which rotatably supports the hub of a power output flange 116. This flange is splined at 118 to one end of the power output shaft 120. Sleeve shaft 88 surrounds shaft 120 and rotatably supports it by means of a bushing 122. A differential side gear 124 is secured or formed integrally with the inboard end of shaft 120.

Flange 116 is held axially fast with respect to shaft 120 by means of a clamping nut 126.

A sleeve shaft 128 is journalled within housing part 68 by means of a ball bearing 130 and by bushing 132. A second steering gear 134 is formed on sleeve shaft 128 between the bushing 132 and the bearings 130. The outboard end of sleeve shaft 128 is splined at 136 to the hub 138 for a brake disc 140. Bolts 142 establish a connection between hub 138 and disc 140.

Hub 138 is journalled within adaptor 84 by means of a bearing 144. An end plate 146 is secured to the housing portion 52 by means of bolts. Plate 146 retains a fluid seal 148 which surrounds the hub 138.

A power output flange 150 is journalled by means of a bearing 152 within the hub 138. It is splined at 154 to the outboard end of a power output shaft 156. Flange 150 is held axially fast upon shaft 156 by a clamping nut 158.

Shaft 156 extends within sleeve shaft 128 and carries at its inboard end a second differential side gear 160.

The carrier housing which is defined by the parts 66 and 68 rotatably supports three pairs of differential pinions, although only one pinion is shown in FIGURE 1. This is identified generally by reference character 162. Pinion 162 includes a pinion shaft 164 upon which pinion elements 166 and 168 are formed. One end of shaft 164 is journalled by means of needle bearings 170 within a bearing opening 172 formed in the housing part 66. The other end of shaft 164 is journalled by means of a bushing 174 within a bearing opening formed in housing part 68.

The left hand end of shaft 164, as viewed in FIGURE 1, is splined as shown at 176 to a steering gear 178.

Shaft 164 is formed with a central lubricating passage 180. The right hand end of passage 180 communicates with a lubricating oil distributor tube 182 which communicates with the interior of a lubricating oil baffle 184. This baffle is provided with a marginal annular reservoir that communicates with the tube 182. It is secured by means of bolts 186 to the housing part 66.

The left hand end of passage 180 also communicates with a lubricating oil distributor tube 188 which is carried by the periphery of a second baffle 190. This baffle may be secured to the housing part 68 by bolts not shown. It defines a marginal annular reservoir that communicates with the distributor tube 188.

Figure 3:
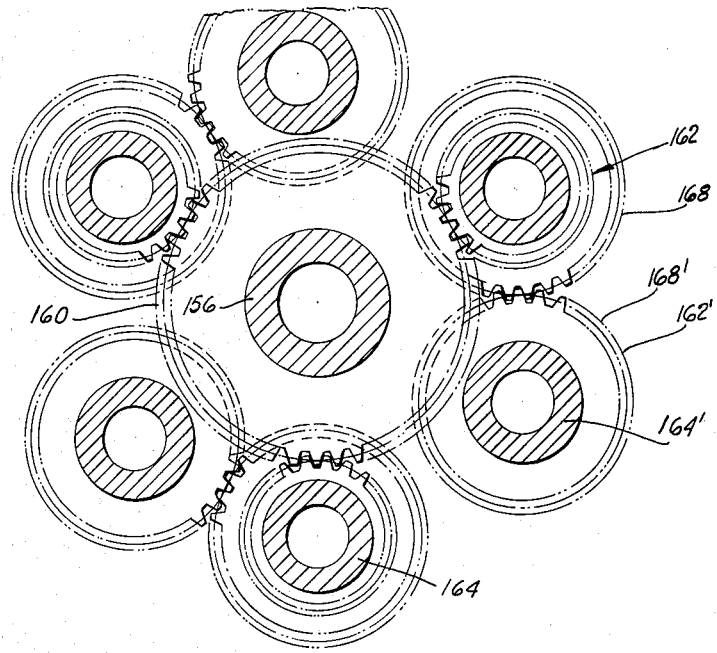
FIGURE 3 is a schematic view of the differential gearing as viewed along the plane of section line 3—3 of FIGURE 1.

As indicated schematically in FIGURE 3, pinion 162 engages drivably a companion pinion 162'. Each of the pinions 162 and 162' is similar to the other although their assembled positions are juxtaposed. A relatively large diameter gear element 168' engages the corresponding gear element 168 of the pinion 162.

Figure 4:
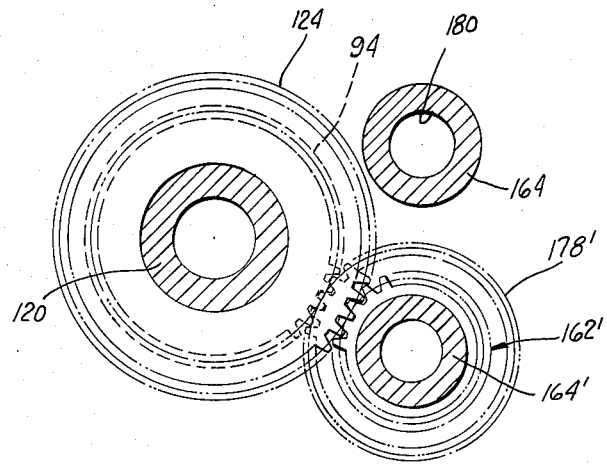
FIGURE 4 is a schematic view of the differential gearing as viewed along the plane of section 4—4 of FIGURE 1.

As best indicated in FIGURE 4, pinion 162' is formed also with a gear element 166' which meshes drivably with the side gear 124. A steering gear 192 is splined on the right hand end of pinion 162' when viewed from the plane of the section of FIGURE 1. This gear 192 engages drivably the steering gear 94.

Pinions 162' are formed also with hollow interiors as in the case of pinions 162. Lubricating oil distributor tubes corresponding to the tubes 182 and 188 are provided also for the pinions 162'.

For purposes of simplicity, each of the three pairs of pinions in FIGURES 3 and 4 have been identified by the same reference characters.

The bearings 172 and 174 for the pinions 162 and the corresponding bearings for the pinions 162' are lubricated by means of radial lubrication passages 194 and 196 which extend from the hollow interior of the pinion shafts.

During operation of the steering differential mechanism thus described, the pinion 10 causes gear 38 to rotate about its axis. This causes rotation of pinion 62 which drives the differential carrier housing. As the carrier housing rotates, it carries pinions 162 and 162'. If the tractive effort of each power output shaft is balanced, the differential pinions will not rotate with respect to the differential carrier housing. The side gears 160 and 164 then are driven in unison with the carrier housing to establish torque delivery to each power output shaft.

Figure 2:
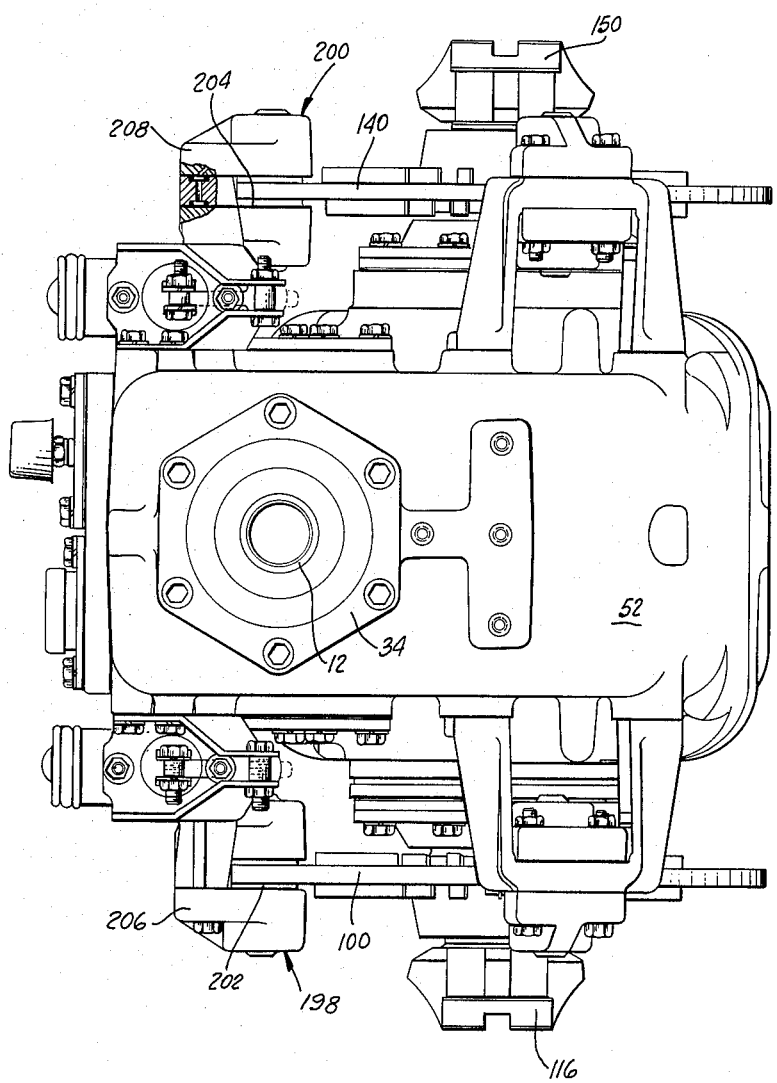
FIGURE 2 is a side view of the structure of FIGURE 1.

If a braking effort is applied to the steering brake discs 140 and 100, controlled geared steering can be accomplished. This braking effort is obtained by means of spot brake assemblies that are identified in FIGURE 2 by reference characters 198 and 200. These assemblies include friction spot brake elements 202 and 204 which are urged into frictional engagement with their respective brake discs by means of fluid pressure operated pistons located within brake housings. The housings are identified by reference characters 206 and 208. One such friction element and piston can be located on each side of the associated brake disc. The spot brake housings in turn are secured to the housing portion 52.

Braking of the vehicle to retard its forward motion can be accomplished by applying the spot brakes for each of the brake discs simultaneously.

If the spot brakes for the disc 100 are applied, the sleeve shaft 88 functions as a reaction shaft for the steering gear 94 and is retarded. This produces an underdrive between the ring gear 64 and the differential side gear 124. At the same time an overdrive is established between ring gear 64 and the differential side gear 160. Thus the power output flange 150 will rotate at a speed that is greater than the speed of the power output flange 116, thereby producing a turning maneuver in one direction.

Turning maneuvers in the opposite direction are accomplished by braking disc 140 to produce an underdrive between ring gear 64 and side gear 160, and at the same time producing an overdrive between ring gear 64 and side gear 124.

The heat developed by the brakes is dissipated by the cooling air that is caused to flow over the surfaces of the discs by reason of the cooling vanes that are attached thereto. The differential lubricating oil thus is not required to dissipate the heat developed by friction and the temperature for the oil thus can be kept within manageable limits.

Lubricating oil is supplied to the baffles 190 and 184 by means of gravity feed. Oil in the vicinity of the bearings 144, for example, drains through a port 210 in the adaptor 84 and through a drain passage 212 formed in the housing part 52. This passage 212 communicates with a tube 214 which extends within the baffle 190 and deposits oil in the peripheral cavity defined thereby. As the carrier housing rotates, the centrifugal effect will create a centrifugal pressure in the lubricating oil, thereby causing circulation of oil into the interior of the pinion shafts.

By appropriately slipping the spot brakes, the radius of turn during turning maneuvers can be varied as desired.

Having thus described a preferred embodiment of our invention, what we claim and desire to secure by U.S. Letters Patent is:

1. A steering differential mechanism comprising a housing, a differential carrier rotatably journalled within said housing, a power input shaft, a driving connection between said power input shaft and said carrier, a pair of differential pinions having first geared portions meshing with each other, said pinions being supported rotatably within said carrier, a pair of differential side gears within said carrier, separate power output shafts connected to each side gear and mounted for rotation about the axis of rotation of said carrier, one pinion having a second geared portion in meshing engagement with one side gear and a corresponding second geared portion of the other pinion being situated in meshing engagement with the other side gear, a separate sleeve shaft surrounding each power output shaft, a steering gear carried by each sleeve shaft within said carrier, a geared connection between each steering gear and a separate one of said pinions, and brake discs connected to said sleeve shaft and rotatably supported by said housing on the exterior thereof whereby controlled geared steering may be accomplished, the first geared portion of each differential pinion being of a pitch diameter that is greater than the pitch diameter of the second geared portion thereof, each geared portion being carried by a common pinion shaft, and pinion bearing means for end supporting said shafts within said carrier.

2. A steering differential mechanism comprising a housing, a differential carrier and ring gear rotatably journalled within said housing, a power input shaft, a driving connection between said power input shaft and said carrier, a pair of differential pinions having first geared portions meshing with each other, said pinions being supported rotatably within said carrier, a pair of differential side gears within said carrier, separate power output shafts connected to each side gear and mounted for rotation about the axis of rotation of said carrier, one pinion having a second geared portion in meshing engagement with one side gear and a corresponding second geared portion of the other pinion being situated in meshing engagement with the other side gear, a separate sleeve shaft surrounding each power output shaft, a steering gear carried by each sleeve shaft within said carrier, a geared connection between each steering gear and a separate one of said pinions, brake discs connected to said sleeve shaft and rotatably supported by said housing on the exterior thereof whereby controlled geared steering may be accomplished, each geared connection including a second steering gear positively connected to one of said pinions, the driving connection between said ring gear and said power input shaft including a driving bevel pinion, a bevel gear engaging said pinion and mounted for rotation about an axis parallel to the axis of said power output shafts, and a second pinion connected to said bevel gear and rotatable therewith, said second pinion engaging said ring gear whereby an additional gear reduction is accomplished, the first geared portion of each differential pinion being of a pitch diameter that is greater than the pitch diameter of the second geared portion thereof, each geared portion being carried by a common pinion shaft, and pinion bearing means for end supporting said shafts within said carrier.

3. A steering differential mechanism comprising a housing, a differential carrier rotatably journalled within said housing, a power input shaft, a driving connection between said power input shaft and said carrier, a pair of differential pinions having first geared portions meshing with each other, said pinions being supported rotatably within said carrier, a pair of differential side gears within said carrier, separate power output shafts connected to each side gear and mounted for rotation about the axis of rotation of said carrier, one pinion having a second geared portion in meshing engagement with one side gear and a corresponding second geared portion of the other pinion being situated in meshing engagement with the other side gear, a separate sleeve shaft surrounding each power output shaft, a steering gear carried by each sleeve shaft within said carrier, a geared connection between each steering gear and a separate one of said pinions, brake discs connected to said sleeve shaft and rotatably supported by said housing on the exterior thereof whereby controlled geared steering may be accomplished, a lubricating oil baffle connected to said carrier for rotation about the axis of said power output shafts, said baffle defining an annular cavity for retaining lubricating oil therein, a lubricating oil distributor element extending from said annular cavity to the region of said differential pinions, said pinions being formed with a hollow interior which communicates with said fluid distributor element, the first geared portion of each differential pinion being of a pitch diameter that is greater than the pitch diameter of the second geared portion thereof, each geared portion being carried by a common pinion shaft, and pinion bearing means end supporting said shafts within said carrier.

4. A steering differential mechanism comprising a housing, a differential carrier and ring gear rotatably journalled within said housing, a power input shaft, a driving connection between said power input shaft and said carrier, a pair of differential pinions having first geared portions meshing with each other, said pinions being supported rotatably within said carrier, a pair of differential side gears within said carrier, separate power output shafts connected to each side gear and mounted for rotation about the axis of rotation of said carrier, one pinion having a second geared portion in meshing engagement with one side gear and a corresponding second geared portion of the other pinion being situated in meshing engagement with the other side gear, a separate sleeve shaft surrounding each power output shaft, a steering gear carried by each sleeve shaft within said carrier, a geared connection between each steering gear and a separate one of said pinions, brake discs connected to said sleeve shaft and rotatably supported by said housing on the exterior thereof whereby controlled geared steering may be accomplished, each geared connection including a second steering gear positively connected to one of said pinions, the driving connection between said ring gear and said power input shaft including a driving bevel pinion, a bevel gear engaging said pinion and mounted for rotation about an axis that is parallel to the axis of said power output shafts, a second pinion connected to said bevel gear and rotatable therewith, said second pinion engaging said ring gear whereby an additional gear reduction is accomplished, a lubricating oil baffle connected to said carrier for rotation about the axis of said power output shafts, said baffle defining an annular cavity for retaining lubricating oil therein, a lubricating oil distributor element extending from said annular cavity to the region of said differential pinions, said pinions being formed with a hollow interior which communicates with said fluid distributor element, the first geared portion of each differential pinion being of a pitch diameter that is greater than the pitch diameter of the second geared portion thereof, each geared portion being carried by a common pinion shaft, and pinion bearing means for end supporting said shafts within said carrier.

References Cited by the Examiner

UNITED STATES PATENTS

| | | | |
|---|---|---|---|
| 2,317,423 | 4/1943 | Vincent | 184—6 |
| 2,876,659 | 3/1959 | Richardson | 74—714 X |
| 2,946,239 | 7/1960 | Hait | 74—710.5 |

FOREIGN PATENTS 651,659  11/1962  Canada.

DAVID J. WILLIAMOWSKY, *Primary Examiner.*
DON A. WAITE, *Examiner.*
J. R. BENEFIEL, *Assistant Examiner.*